US011234156B2

(12) United States Patent
Tang

(10) Patent No.: US 11,234,156 B2
(45) Date of Patent: Jan. 25, 2022

(54) INFORMATION TRANSMISSION METHOD AND DEVICE

(71) Applicant: Guangdong OPPO Mobile Telecommunications Corp., Ltd., Guangdon (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 51 days.

(21) Appl. No.: 16/774,994

(22) Filed: Jan. 28, 2020

(65) Prior Publication Data
US 2020/0196184 A1   Jun. 18, 2020

Related U.S. Application Data

(63) Continuation of application No. PCT/CN2017/102796, filed on Sep. 21, 2017.

(51) Int. Cl.
*H04W 28/02* (2009.01)
*H04L 1/00* (2006.01)
(Continued)

(52) U.S. Cl.
CPC ....... *H04W 28/0278* (2013.01); *H04L 1/0008* (2013.01); *H04W 72/0413* (2013.01); *H04W 72/14* (2013.01); *H04W 80/02* (2013.01)

(58) Field of Classification Search
CPC ......... H04W 28/0278; H04W 72/0413; H04W 72/14; H04W 80/02; H04W 72/1284; H04W 28/06; H04W 80/00; H04L 1/0008
See application file for complete search history.

(56) References Cited

U.S. PATENT DOCUMENTS

2009/0219951 A1* 9/2009 Chun ............... H04W 28/06
370/474
2013/0114445 A1* 5/2013 Wen ............... H04L 5/0007
370/252
(Continued)

FOREIGN PATENT DOCUMENTS

CN    102056332    5/2011
CN    102111751    6/2011
(Continued)

OTHER PUBLICATIONS

3GPP TSG-RAN WG2 NR Ad Hoc;R2-1706468, Source: Huawei, HiSilicon, Title: Flexible length BSR format, Qingdao, China, Jun. 27-29, 2017. (Year: 2017).*
(Continued)

*Primary Examiner* — Hassan A Phillips
*Assistant Examiner* — Mohammed S Chowdhury
(74) *Attorney, Agent, or Firm* — Perkins Coie LLP

(57) ABSTRACT

Embodiments of this application provide an information transmission method and device, to report a BSR of an LCG. The method includes: determining, by a terminal device, a target BSR format in at least three BSR formats according to a first LCG set that is in a plurality of LCGs and that has to-be-transmitted data, wherein the first LCG set includes at least one LCG; and reporting, by the terminal device, BSRs of some or all LCGs in the first LCG set by using the target BSR format.

11 Claims, 3 Drawing Sheets

200

┌─────────────────────────────────────────────────────────────┐
│ A terminal device determines a target BSR format in at least three buffer status report (BSR) formats according to a first LCG set that is in a plurality of logical channel groups LCG and that has to-be-transmitted data, wherein the first LCG set includes at least one LCG │  S210
└─────────────────────────────────────────────────────────────┘
                                    │
┌─────────────────────────────────────────────────────────────┐
│ The terminal device reports BSRs of some or all LCGs in the first LCG set by using the target BSR format │  S220
└─────────────────────────────────────────────────────────────┘

(51) Int. Cl.
  *H04W 72/04* (2009.01)
  *H04W 72/14* (2009.01)
  *H04W 80/02* (2009.01)

(56) References Cited

U.S. PATENT DOCUMENTS

| | | | | |
|---|---|---|---|---|
| 2014/0126399 | A1* | 5/2014 | Damnjanovic | H04W 24/10 370/252 |
| 2016/0044678 | A1* | 2/2016 | Kwon | H04W 72/0453 370/329 |
| 2016/0044737 | A1 | 2/2016 | Kwon | |
| 2017/0006468 | A1 | 1/2017 | Takahashi et al. | |
| 2017/0006628 | A1* | 1/2017 | Takahashi | H04L 69/28 |
| 2020/0068600 | A1* | 2/2020 | Yu | H04W 28/0278 |
| 2020/0137785 | A1* | 4/2020 | Deogun | H04W 72/1284 |
| 2020/0187046 | A1* | 6/2020 | Bergquist | H04W 72/1284 |

FOREIGN PATENT DOCUMENTS

| | | |
|---|---|---|
| CN | 106535246 | 3/2017 |
| EP | 3122152 A1 | 1/2017 |
| JP | 2013526223 A | 6/2013 |

OTHER PUBLICATIONS

3GPP TSG-RAN WG2 NR #99; R2-1707721; Source: Huawei, HiSilicon, Title: Flexible length BSR format Berlin, Germany, Aug. 21-25, 2017. (Year: 2017).*

3GPP TSG-RAN WG2 NR Ad Hoc #2; R2-1707061; Source: vivo; Title: BSR format in NR, Qingdao, China, Jun. 27-29, 2017 (Year: 2017).*

3GPP TSG-RAN2#99; R2-1707778; Source: OPPO; Title: Discussion on BSR format, Berlin, Germany, Aug. 21-25, 2017. (Year: 2017).*

ZTE, "GCF Priority 1-Update of MAC test cases 7.1.4.6, .1.4.7, .1.4.8,".R5-100383, 3GPP TSG-RAN5 Meeting #46, Feb. 2010, San Francisco, USA.

European Patent Application No. 17925822.3, "Extended European Search Report" dated May 27, 2020, 8 pages.

Vice-Chairwoman (Interdigital), "Report from LTE and NR User Plane Break-Out Session", 3G99 TSG-RAN WG2 Meeting #99, Aug. 21-25, 2017, 60 pages, Berlin, Germany.

International Patent Application No. PCT/CN2017/102796, "International Search Report and Written Opinion", dated Jun. 7, 2018, 9 pages.

3rd Generation Partnership Project; Technical Specification Group Radio Access Network; Evolved Universal Terrestrial Radio Access (E-UTRA); Medium Access Control (MAC) protocol specification (Release 13), 3GPP TS 36.321 V13.6.0 (Jun. 2017).

Written Opinion of the International Search Authority in the international application No. PCT/CN2017/102796, dated Jun. 7, 2018.

First Office Action of the Chinese application No. 202010085844.6, dated May 7, 2021.

First Office Action of the Europe application No. 17925822.3, dated Mar. 23, 2021.

First Office Action of the Chile application No. 202000671, dated May 19, 2021.

Ericsson "BSR formats in NR", 3GPP TSG-RAN WG2 #99 Tdoc R2-1708349, Aug. 25, 2017.

Intel Corporation "BSR enhancements", 3GPP TSG RAN WG2 Meeting #99 R2-1708790, Aug. 25, 2017.

Vivo "Placement of RLC segment in MAC PDU", 3GPP TSG-RAN WG2 NRAd Hoc #2 R2-1707061, Jun. 29, 2017.

Samsung "Truncated BSR Operation", 3GPP TSG-RAN WG2#99 Meeting R2-1709239, Aug. 25, 2017.

Huawei, HiSilicon "Flexible length BSR format", 3GPP Draft; R2-1706468,Jun. 17, 2017.

First Office Action of the Indian application No. 202017016935, dated Jun. 29, 2021. 6 pages with English translation.

Notice of Impending Authorization of the Chilean application No. 202000671, dated Aug. 17, 2021. 17 pages with English translation.

First Office Action of the Japanese application No. 2020-516594, dated Oct. 5, 2021. 6 pages with English translation.

* cited by examiner

200

A terminal device determines a target BSR format in at least three buffer status report (BSR) formats according to a first LCG set that is in a plurality of logical channel groups LCG and that has to-be-transmitted data, wherein the first LCG set includes at least one LCG  S210

The terminal device reports BSRs of some or all LCGs in the first LCG set by using the target BSR format  S220

*FIG. 2*

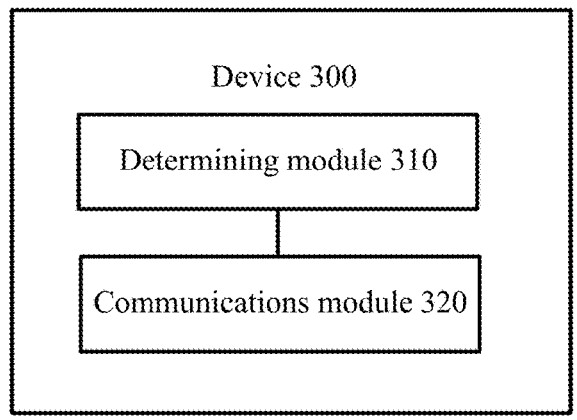

*FIG. 3*

INFORMATION TRANSMISSION METHOD AND DEVICE

CROSS-REFERENCES TO RELATED APPLICATIONS

This application is a continuation of and claims priority to International Patent Application PCT/CN2017/102796, filed on Sep. 21, 2017, the contents of which are hereby incorporated by reference in their entirety.

BACKGROUND OF THE INVENTION

Technical Field

This application relates to the communications field, and more specifically, to an information transmission method and device.

Related Art

In the discussion of the 3rd Generation Partnership Project (3GPP), for a buffer status report (BSR) format, the following two cases are included:

In a first case, three BSR formats are included: a short BSR, a truncated BSR, and a flexible long BSR. The short BSR occupies one byte, the truncated BSR occupies one or more bytes, and the flexible long BSR supports reporting of BSRs of one to eight logical channel groups (LCG).

In a second case, four BSR formats are included: a short BSR, a truncated BSR, a flexible BSR, and a long BSR. The short BSR occupies one byte, the truncated BSR occupies one or more bytes, the flexible BSR supports reporting of BSRs of two to seven LCGs, and the long BSR supports reporting of BSRs of all LCGs.

SUMMARY OF THE INVENTION

An information transmission method and device are provided in embodiments of this application, to report a BSR of an LCG.

According to a first aspect, an information transmission method is provided. The method includes determining, by a terminal device, a target BSR format in at least three BSR formats according to a first LCG set that is in a plurality of LCGs and that has to-be-transmitted data, where the first LCG set includes at least one LCG; and reporting, by the terminal device, BSRs of some or all LCGs in the first LCG set by using the target BSR format.

Therefore, according to the information transmission method in this embodiment of this application, the terminal device can determine the target BSR format according to the first LCG set that has the to-be-transmitted data. Therefore, a manner of reporting the BSR can be flexibly adjusted.

With reference to the first aspect, in some implementations of the first aspect, the determining, by a terminal device, a target BSR format in at least three BSR formats according to a first LCG set that is in a plurality of LCGs and that has to-be-transmitted data includes determining, by the terminal device, the target BSR format in the at least three BSR formats according to a trigger manner of the BSR and a quantity of LCGs included in the first LCG set.

With reference to the first aspect, in some implementations of the first aspect, the at least three BSR formats include a short BSR, a truncated BSR, and a flexible long BSR, where the short BSR is used to report a BSR of one LCG, the truncated BSR is used to report a BSR of one LCG, the flexible long BSR is used to report BSRs of LCGs within a first quantity range, and a lower limit of the first quantity range is 1.

With reference to the first aspect, in some implementations of the first aspect, an upper limit of the first quantity range is 8.

With reference to the first aspect, in some implementations of the first aspect, the determining, by the terminal device, the target BSR format in the at least three BSR formats according to a trigger manner of the BSR and a quantity of LCGs included in the first LCG set includes, if the trigger manner of the BSR is a regular BSR or a periodic BSR, and the quantity of LCGs included in the first LCG set is greater than one, determining, by the terminal device, the flexible long BSR as the target BSR format; or if the trigger manner of the BSR is a regular BSR or a periodic BSR, and the quantity of LCGs included in the first LCG set is one, determining, by the terminal device, the short BSR as the target BSR format.

With reference to the first aspect, in some implementations of the first aspect, the determining, by the terminal device, the target BSR format in the at least three BSR formats according to a trigger manner of the BSR and a quantity of LCGs included in the first LCG set includes, if the trigger manner of the BSR is a padding BSR, determining, by the terminal device, the target BSR format in the at least three BSR formats according to the quantity of LCGs included in the first LCG set and a size of an uplink grant resource.

Therefore, according to the information transmission method in this embodiment of this application, the terminal device can determine the target BSR format according to the first LCG set that has the to-be-transmitted data, and the size of the uplink grant resource, thereby improving resource utilization.

With reference to the first aspect, in some implementations of the first aspect, the determining, by the terminal device, the target BSR format in the at least three BSR formats according to the quantity of LCGs included in the first LCG set and a size of an uplink grant resource includes determining, by the terminal device, the target BSR format in the at least three BSR formats according to the quantity of LCGs included in the first LCG set, and a size of a padding bit of a Media Access Control MAC protocol data unit PDU in the uplink grant resource.

With reference to the first aspect, in some implementations of the first aspect, the determining, by the terminal device, the target BSR format in the at least three BSR formats according to the quantity of LCGs included in the first LCG set, and a size of a padding bit of a Media Access Control MAC protocol data unit PDU in the uplink grant resource includes, if the size of the padding bit of the MAC PDU is greater than or equal to a size of a first resource required for performing reporting by using the short BSR, and the quantity of LCGs included in the first LCG set is one, determining, by the terminal device, the short BSR as the target BSR format. If the size of the padding bit of the MAC PDU is greater than or equal to a size of a first resource required for performing reporting by using the short BSR and less than a size of a second resource that is required for reporting a BSR of each LCG in the first LCG set by using the flexible long BSR, and the quantity of LCGs included in the first LCG set is greater than one, determining, by the terminal device, the truncated BSR as the target BSR format; or if the size of the padding bit of the MAC PDU is greater than or equal to a size of a second resource, determining, by the terminal device, the flexible long BSR as the target BSR format.

Therefore, according to the information transmission method in this embodiment of this application, the terminal device can determine a specific BSR format to be used, according to the first LCG set, and the size of the padding bit. Therefore, the size of the padding bit of the MAC PDU can be used to the maximum extent, thereby helping improve the resource utilization.

With reference to the first aspect, in some implementations of the first aspect, the reporting, by the terminal device, BSRs of some or all LCGs in the first LCG set by using the target BSR format includes: if the truncated BSR is determined as the target BSR format, preferentially reporting, by the terminal device, a BSR of an LCG corresponding to a logical channel having a high priority.

With reference to the first aspect, in some implementations of the first aspect, the at least three BSR formats include a short BSR, a truncated BSR, a flexible BSR, and a long BSR, where the short BSR is used to report a BSR of one LCG, the truncated BSR is used to report a BSR of one LCG, the flexible BSR is used to report BSRs of LCGs within a second quantity range, a lower limit of the second quantity range is greater than 1, an upper limit of the second quantity range is less than a first value, and a quantity of BSRs that can be reported by using the long BSR is the first value.

With reference to the first aspect, in some implementations of the first aspect, the first value is 8, the lower limit of the second quantity range is 2, and the upper limit of the second format range is 7.

With reference to the first aspect, in some implementations of the first aspect, the determining, by the terminal device, the target BSR format in the at least three BSR formats according to a trigger manner of the BSR and a quantity of LCGs included in the first LCG set includes: if the trigger manner of the BSR is a regular BSR or a periodic BSR, and the quantity of LCGs included in the first LCG set is one, determining, by the terminal device, the short BSR as the target BSR format; if the trigger manner of the BSR is a regular BSR or a periodic BSR, and the quantity of LCGs included in the first LCG set falls within a first quantity range, determining, by the terminal device, the flexible BSR as the target BSR format; or if the trigger manner of the BSR is a regular BSR or a periodic BSR, and the quantity of LCGs included in the first LCG set is the first value, determining, by the terminal device, that the target BSR format is the long BSR.

With reference to the first aspect, in some implementations of the first aspect, the determining, by the terminal device, the target BSR format in the at least three BSR formats according to a trigger manner of the BSR and a quantity of LCGs included in the first LCG set includes: if the trigger manner of the BSR is a padding BSR, determining, by the terminal device, the target BSR format in the at least three BSR formats according to the quantity of LCGs included in the first LCG set and a size of an uplink grant resource.

Therefore, according to the information transmission method in this embodiment of this application, the terminal device can determine the target BSR format according to the first LCG set that has the to-be-transmitted data, and the size of the uplink grant resource, thereby improving resource utilization.

With reference to the first aspect, in some implementations of the first aspect, the determining, by the terminal device, the target BSR format in the at least three BSR formats according to the quantity of LCGs included in the first LCG set and a size of an uplink grant resource includes determining, by the terminal device, the target BSR format in the at least three BSR formats according to the quantity of LCGs included in the first LCG set, and a size of a padding bit of a MAC PDU in the uplink grant resource.

With reference to the first aspect, in some implementations of the first aspect, the determining, by the terminal device, the target BSR format in the at least three BSR formats according to the quantity of LCGs included in the first LCG set, and a size of a padding bit of a Media Access Control MAC protocol data unit PDU in the uplink grant resource includes: if the size of the padding bit of the MAC PDU is greater than or equal to a size of a first resource required for performing reporting by using the short BSR, and the quantity of LCGs included in the first LCG set is one, determining, by the terminal device, the short BSR as the target BSR format; if the size of the padding bit of the MAC PDU is greater than or equal to the size of the first resource required for performing reporting by using the short BSR and less than a size of a second resource that is required for reporting a BSR of each LCG in the first LCG set by using the flexible BSR, and the quantity of LCGs included in the first LCG set is greater than one, determining, by the terminal device, the truncated BSR as the target BSR format; if the size of the padding bit of the MAC PDU is greater than or equal to a size of a second resource required for reporting a BSR by using the flexible BSR, and the quantity of LCGs included in the first LCG set falls within the second quantity range, determining, by the terminal device, the flexible BSR as the target BSR format; or if the size of the padding bit of the MAC PDU is greater than or equal to a size of a resource required for reporting a BSR by using the long BSR, and the quantity of LCGs included in the first LCG set is the first value, determining, by the terminal device, that the target BSR format is the long BSR.

Therefore, according to the information transmission method in this embodiment of this application, the terminal device can determine a specific BSR format to be used, according to the first LCG set, and the size of the padding bit. Therefore, the size of the padding bit of the MAC PDU can be used to the maximum extent, thereby helping improve the resource utilization.

With reference to the first aspect, in some implementations of the first aspect, the reporting, by the terminal device, BSRs of some or all LCGs in the first LCG set by using the target BSR format includes: if the truncated BSR is determined as the target BSR format, and the quantity of LCGs included in the first LCG set is greater than one, preferentially reporting, by the terminal device, a BSR of an LCG corresponding to a logical channel having a high priority.

According to a second aspect, an information transmission device is provided. The apparatus includes units configured to perform the method in any one of the first aspect or the possible implementations of the first aspect.

As an example, an embodiment provides an information transmission device comprising a determining module, configured to determine a target BSR format in at least three BSR formats according to a first LCG set that is in a plurality of LCGs and that has to-be-transmitted data, wherein the first LCG set comprises at least one LCG and a communications module, configured to report BSRs of some or all LCGs in the first LCG set by using the target BSR format. In an embodiment, the determining module is specifically configured to determine the target BSR format in the at least three BSR formats according to a trigger manner of the BSR and a quantity of LCGs comprised in the first LCG set.

The at least three BSR formats can include a short BSR, a truncated BSR, a flexible BSR, and a long BSR. The short BSR is used to report a BSR of one LCG, the truncated BSR is used to report a BSR of one LCG, the flexible BSR is used to report BSRs of LCGs within a second quantity range, a lower limit of the second quantity range is greater than 1, an upper limit of the second quantity range is less than a first value, and a quantity of BSRs that can be reported by using the long BSR is the first value. The first value can be 8, the lower limit of the second quantity range can be 2, and the upper limit of the second format range can be 7.

In an embodiment, the determining module is further configured to: if the trigger manner of the BSR is a padding BSR, determine the target BSR format in the at least three BSR formats according to the quantity of LCGs comprised in the first LCG set and a size of an uplink grant resource. The determining module can be specifically configured to determine the target BSR format in the at least three BSR formats according to the quantity of LCGs comprised in the first LCG set, and a size of a padding bit of a MAC PDU in the uplink grant resource. The determining module can be specifically configured to: if the size of the padding bit of the MAC PDU is greater than or equal to a size of a first resource required for performing reporting by using the short BSR, and the quantity of LCGs comprised in the first LCG set is one, determine the short BSR as the target BSR format; if the size of the padding bit of the MAC PDU is greater than or equal to a size of a first resource required for performing reporting by using the short BSR and less than a size of a second resource that is required for reporting a BSR of each LCG in the first LCG set by using the flexible BSR, and the quantity of LCGs comprised in the first LCG set is greater than one, determine the truncated BSR as the target BSR format; if the size of the padding bit of the MAC PDU is greater than or equal to a size of a second resource required for reporting a BSR by using the flexible BSR, and the quantity of LCGs comprised in the first LCG set falls within the second quantity range, determine the flexible BSR as the target BSR format; or if the size of the padding bit of the MAC PDU is greater than or equal to a size of a resource required for reporting a BSR by using the long BSR, and the quantity of LCGs comprised in the first LCG set is the first value, determine that the target BSR format is the long BSR.

The at least three BSR formats can include a short BSR, a truncated BSR, and a flexible long BSR, wherein the short BSR is used to report a BSR of one LCG, the truncated BSR is used to report a BSR of one LCG, the flexible long BSR is used to report BSRs of LCGs within a first quantity range, and a lower limit of the first quantity range is 1. The upper limit of the first quantity range can be 8.

In another embodiment, the determining module is further configured to: if the trigger manner of the BSR is a regular BSR or a periodic BSR, and the quantity of LCGs comprised in the first LCG set is one, determine the short BSR as the target BSR format; if the trigger manner of the BSR is a regular BSR or a periodic BSR, and the quantity of LCGs comprised in the first LCG set falls within a first quantity range, determine the flexible BSR as the target BSR format; or if the trigger manner of the BSR is a regular BSR or a periodic BSR, and the quantity of LCGs comprised in the first LCG set is the first value, determine the long BSR as the target BSR format. The communications module can be specifically configured to: if the truncated BSR is determined as the target BSR format, and the quantity of LCGs comprised in the first LCG set is greater than one, preferentially report a BSR of an LCG corresponding to a logical channel having a high priority. Moreover, the determining module can be further configured to: if the trigger manner of the BSR is a regular BSR or a periodic BSR, and the quantity of LCGs comprised in the first LCG set is greater than one, determine the flexible long BSR as the target BSR format; or if the trigger manner of the BSR is a regular BSR or a periodic BSR, and the quantity of LCGs comprised in the first LCG set is one, determine the short BSR as the target BSR format.

The determining module can be further configured to: if the trigger manner of the BSR is a padding BSR, determine the target BSR format in the at least three BSR formats according to the quantity of LCGs comprised in the first LCG set and a size of an uplink grant resource. The determining module can be specifically configured to determine the target BSR format in the at least three BSR formats according to the quantity of LCGs comprised in the first LCG set, and a size of a padding bit of a Media Access Control MAC protocol data unit PDU in the uplink grant resource. The determining module can be specifically configured to: if the size of the padding bit of the MAC PDU is greater than or equal to a size of a first resource required for performing reporting by using the short BSR, and the quantity of LCGs comprised in the first LCG set is one, determine the short BSR as the target BSR format; if the size of the padding bit of the MAC PDU is greater than or equal to a size of a first resource required for performing reporting by using the short BSR and less than a size of a second resource that is required for reporting a BSR of each LCG in the first LCG set by using the flexible long BSR, and the quantity of LCGs comprised in the first LCG set is greater than one, determine the truncated BSR as the target BSR format; or if the size of the padding bit of the MAC PDU is greater than or equal to a size of a second resource, determine the flexible long BSR as the target BSR format.

The first resource can be a resource occupied by the short BSR and a subheader corresponding to the short BSR; and the second resource can be a resource occupied by the flexible long BSR by using which a BSR of each LCG in the first LCG set is reported and a subheader corresponding to the flexible long BSR. The communications module can be specifically configured to: if the truncated BSR is determined as the target BSR format, preferentially report a BSR of an LCG corresponding to a logical channel having a high priority.

According to a third aspect, an information transmission device is provided. The device includes a memory, a processor, and a transceiver. The memory is configured to store a program, the processor is configured to execute the program, and when the program is executed, the processor performs the method in the first aspect based on the transceiver.

According to a fourth aspect, a computer-readable medium is provided. The computer-readable medium stores program code to be executed by the terminal device, and the program code includes an instruction used to perform the method in any one of the first aspect or the various implementations thereof.

According to a fifth aspect, a computer program product including an instruction is provided, and when the product is run on a computer, the computer is enabled to perform the method according to any one of the first aspect or any optional implementation of the first aspect.

BRIEF DESCRIPTION OF THE DRAWINGS

FIG. 2 is a schematic flowchart of an information transmission method according to an embodiment of this application.

FIG. 3 is a schematic block diagram of an information transmission device according to an embodiment of this application.

DETAILED DESCRIPTION OF THE INVENTION

The following describes technical solutions in embodiments of this application with reference to accompanying drawings.

It should be understood that the technical solutions in the present invention may be applied to various communications systems, for example: a Global System for Mobile Communications (GSM) system, a Code Division Multiple Access (CDMA) system, a Wideband Code Division Multiple Access (WCDMA) system, a general packet radio service (GPR), a Long Term Evolution (LTE) system, a Long Term Evolution Advanced (LTE-A) system, a Universal Mobile Telecommunications System (UMTS), and 5G.

Figure 1:
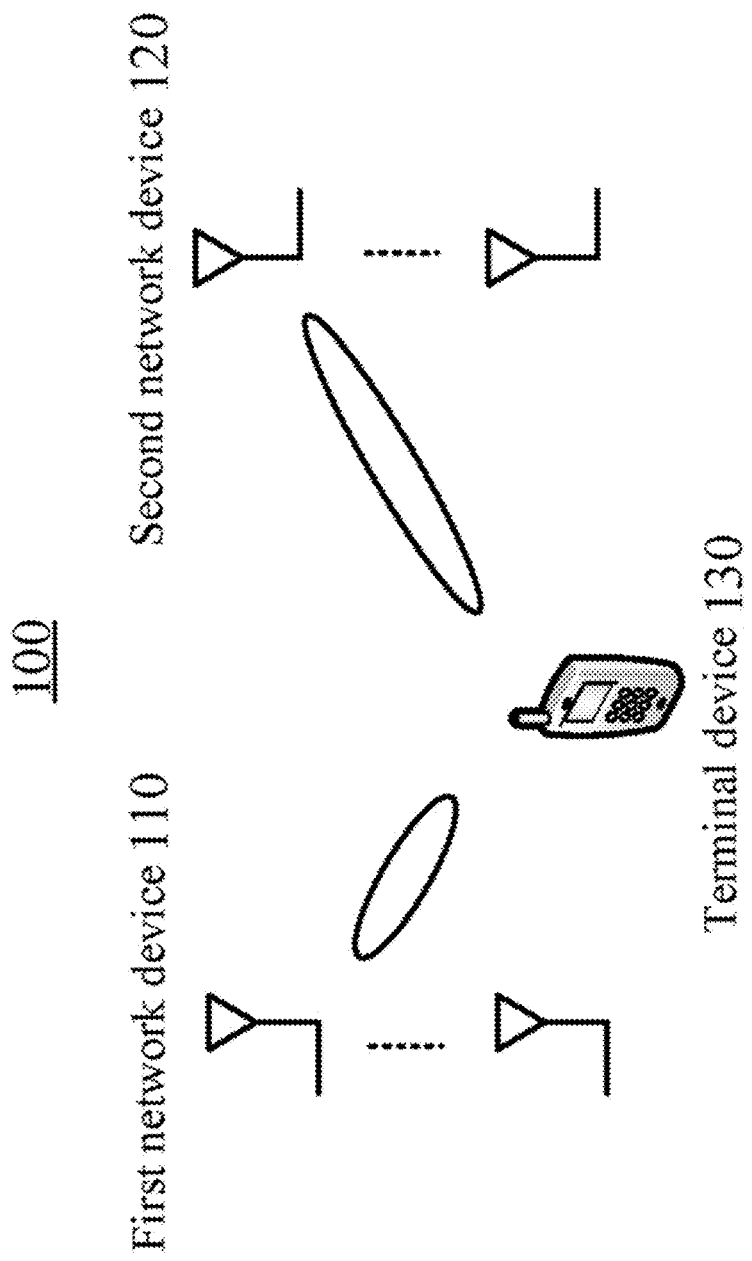
FIG. 1 is a schematic diagram of a wireless communications system according to an embodiment of this application.

FIG. 1 shows a wireless communications system 100 applicable to an embodiment of the present invention. The wireless communications system 100 may include at least one network device, for example, a first network device 110 and a second network device 120 shown in FIG. 1. The first network device 110 and the second network device 120 can both communicate with the terminal device 130 through an air interface. The first network device 110 and the second network device 120 can provide communication coverage for a particular geographical area, and can communicate with a terminal device in the coverage. The first network device 110 or the second network device 120 may be a base transceiver station (BTS) in the GSM system or the CDMA system, a NodeB in the WCDMA system, an evolved NodeB (eNB or eNodeB) in the LTE system, or a network device in the future 5G network such as a transmission reception point (TRP), a base station, and a base station device. This is not particularly limited in the embodiments of the present invention.

The wireless communications system 100 further includes one or more terminal devices (UE) 130 located in the coverage of the first network device 110 and the second network device 120. The terminal device 130 may be movable or fixed. The terminal device 130 may communicate with one or more core networks by using a radio access network (RAN). The terminal device may be referred to as an access terminal, a terminal device, a subscriber unit, a subscriber station, a mobile station, a mobile console, a remote station, a remote terminal, a mobile device, a user terminal, a terminal, radio communications device, a user agent, or a user apparatus. The terminal device may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, or a terminal device in a future 5G network.

As described above, in an NR system, at least three BSR formats may be supported. Based on a latest BSR format, how to report a BSR is a problem that needs to be resolved urgently.

In view of this, embodiments of this application provide an information transmission method, to determine a reporting format of a BSR according to an LCG that has to-be-transmitted data.

FIG. 2 is a schematic flowchart of an information transmission method 200 according to an embodiment of this application. The method 200 may be performed by the terminal device in the wireless communications system shown in FIG. 1. As shown in FIG. 2, the method 200 includes:

S210. A terminal device determines a target BSR format in at least three BSR formats according to a first LCG set that is in a plurality of LCGs and that has to-be-transmitted data, where the first LCG set includes at least one LCG.

S220. The terminal device reports BSRs of some or all LCGs in the first LCG set by using the target BSR format.

It should be noted that, the quantity of the plurality of LCGs may be 8, as determined in a latest NR discussion, or may be more than 8 or less than 8, for example, 4 or 6. The quantity of the plurality of LCGs is not limited in this embodiment of this application.

In this embodiment of this application, the at least three BSR formats may include three types of BSR formats: a short BSR, a truncated BSR, and a flexible long BSR, as described in the first case in the foregoing description; or may include four types of formats: a short BSR, a truncated BSR, a flexible BSR, and a long BSR, as described in the second case. Alternatively, the at least three formats may also include: a BSR format 1 used to report BSRs of two LCGs, a BSR format 2 used to report BSRs of four LCGs, and a BSR format 3 used to report BSRs of eight LCGs. This is not specifically limited in this embodiment of this application.

In an embodiment, S210 may include determining, by the terminal device, the target BSR format in the at least three BSR formats according to a trigger manner of the BSR and a quantity of LCGs included in the first LCG set.

By way of example and not limitation, in this embodiment of this application, a trigger manner of a BSR may include a regular BSR, a periodic BSR, and a padding BSR. The padding BSR is reported by using a padding bit of a media access control (MAC) protocol data unit (PDU).

For example, when the trigger manner of the BSR is the regular BSR or the periodic BSR, the terminal device determines a specific BSR format for reporting, according to the quantity of LCGs included in the first LCG set that has the to-be-transmitted data; or when the trigger manner of the BSR is the padding BSR, further determines a specific BSR format for reporting, with reference to the size of the padding bit.

The following describes in detail how the terminal device determines the target BSR format by using an example in which the at least three BSR formats include the three BSR formats included in the first case or the four BSR formats included in the second case in the foregoing description.

Case 1:

The at least three BSR formats include: a short BSR, a truncated BSR, and a flexible long BSR. The short BSR is used to report a BSR of one LCG, the truncated BSR is used to report a BSR of one LCG, the flexible long BSR is used to report BSRs of LCGs within a first quantity range, and a lower limit of the first quantity range is 1.

In this embodiment, an upper limit of the first quantity range is 8, that is, the flexible long BSR may be used to report BSRs of 1 to 8 LCGs.

In an embodiment, S210 may include:

if the trigger manner of the BSR is a regular BSR or a periodic BSR, and the quantity of LCGs included in the first LCG set is greater than one, determining, by the terminal device, the flexible long BSR as the target BSR format; or if the trigger manner of the BSR is a regular BSR or a periodic BSR, and the quantity of LCGs included in the first LCG set is one, determining, by the terminal device, that the target BSR format is a short BSR.

That is, when the quantity of LCGs included in the first LCG set is 1, the terminal device can determine to use the short BSR; and when the quantity of LCGs included in the first LCG set is greater than 1, determine to use the flexible long BSR, namely, the flexible long BSR. For example, if the quantity of LCGs included in the first LCG set is 2, the terminal device may use the flexible long BSR to report BSRs of the two LCGs; or if the quantity of LCGs included in the first LCG set is 8, the terminal device may use the flexible long BSR to report BSRs of the eight LCGs.

In another embodiment, S210 may include: if the trigger manner of the BSR is a padding BSR, determining, by the terminal device, the target BSR format in the at least three BSR formats according to the quantity of LCGs included in the first LCG set and a size of an uplink grant resource.

For example, when the size of the uplink grant resource is sufficient to report a BSR of each LCG in the first LCG set, the terminal device determines that a quantity of LCGs that can be reported by using the target BSR format is greater than or equal to the quantity of LCGs included in the first LCG set; or if the size of the uplink grant resource is insufficient to report a BSR of each LCG in the first LCG set, the terminal device may report only BSRs of some LCGs in the first LCG set.

For example, the first LCG set includes three LCGs. If the size of the uplink grant resource is sufficient to report BSRs of four LCGs, the terminal device may determine to use the flexible long BSR to report the BSRs of the four LCGs; or if the size of the uplink grant resource is sufficient to transmit BSRs of only two LCGs, the terminal device may determine to use the truncated BSR to report a BSR of one LCG in the first LCG set. For example, the terminal device may report a BSR of an LCG corresponding to a logical channel having a high priority.

Therefore, according to the information transmission method in this embodiment of this application, the terminal device can determine the target BSR format according to the first LCG set that has the to-be-transmitted data, and the size of the uplink grant resource, thereby improving resource utilization.

In a specific embodiment, the determining, by the terminal device, the target BSR format in the at least three BSR formats according to the quantity of LCGs included in the first LCG set and a size of an uplink grant resource includes determining, by the terminal device, the target BSR format in the at least three BSR formats according to the quantity of LCGs included in the first LCG set, and a size of a padding bit of a Media Access Control MAC protocol data unit PDU in the uplink grant resource.

For example, if the size of the padding bit of the MAC PDU is greater than or equal to a size of a first resource required for performing reporting by using the short BSR, and the quantity of LCGs included in the first LCG set is one, the terminal device determines the short BSR as the target BSR format;

if the size of the padding bit of the MAC PDU is greater than or equal to a size of a first resource required for performing reporting by using the short BSR and less than a size of a second resource that is required for reporting a BSR of each LCG in the first LCG set by using the flexible long BSR, and the quantity of LCGs included in the first LCG set is greater than one, the terminal device determines the truncated BSR as the target BSR format; or if the size of the padding bit of the MAC PDU is greater than or equal to a size of a second resource, the terminal device determines the flexible long BSR as the target BSR format.

For example, if the quantity of LCGs included in the first LCG set is one, and the size of the padding bit is greater than or equal to the size of the first resource required for performing reporting by using the short BSR, the terminal device may determine to use the short BSR for reporting. Herein, the first resource is a resource occupied by the short BSR and a subheader corresponding to the short BSR.

Alternatively, if the size of the padding bit is sufficient to report BSRs of three LCGs, and the first LCG set includes four LCGs, that is, the size of the padding bit is less than the size of the second resource required for reporting BSRs of the four LCGs by using the flexible long BSR, the terminal device may determine to use the truncated BSR to report BSRs of some LCGs in the first LCG set. Herein, the second resource is a resource occupied by the flexible long BSR by using which a BSR of each LCG in the first LCG set is reported and a subheader corresponding to the flexible long BSR.

Alternatively, if the size of the padding bit is greater than or equal to the size of the second resource required for reporting a BSR of each LCG in the first LCG set by using the flexible long BSR, the terminal device may determine to use the flexible long BSR to report the BSR of each LCG in the first LCG set. For example, the first LCG set includes four LCGs. If the size of the padding bit is greater than or equal to a size of a resource occupied by the flexible long BSR used to report the four LCGs and a corresponding subheader, the terminal device may report BSRs of the four LCGs by using the flexible long BSR; Alternatively, the first LCG set includes six LCGs. If the size of the padding bit is greater than or equal to a size of a resource occupied by the flexible long BSR used to report the six LCGs and a corresponding subheader, the terminal device may report BSRs of the six LCGs by using the flexible long BSR. That is, when the size of the padding bit is sufficient to report a BSR of each LCG in the first LCG set, the terminal device may use the flexible long BSR to report the BSR of each LCG in the first LCG set.

Therefore, according to the information transmission method in this embodiment of this application, the terminal device can determine a specific BSR format to be used, according to the first LCG set, and the size of the padding bit. Therefore, the size of the padding bit of the MAC PDU can be used to the maximum extent, thereby helping improve the resource utilization.

In some embodiments, S220 may include: if the truncated BSR is determined as the target BSR format, preferentially reporting, by the terminal device, a BSR of an LCG corresponding to a logical channel having a high priority.

In this embodiment, if the quantity of LCGs included in the first LCG set is greater than 1, but however, the truncated BSR cannot be used to report the BSR of each LCG, the terminal device can preferentially report a BSR of an LCG that corresponds to a logical channel having a relatively high priority and that is in the first LCG set.

Case 2:

The at least three BSR formats include: a short BSR, a truncated BSR, a flexible BSR, and a long BSR, where the short BSR is used to report a BSR of one LCG, the truncated BSR is used to report a BSR of one LCG, the flexible BSR is used to report BSRs of LCGs within a second quantity range, a lower limit of the second quantity range is greater than 1, an upper limit of the second quantity range is less than a first value, and a quantity of BSRs that can be reported by using the long BSR is the first value.

In this embodiment, the first value is 8, the lower limit of the second quantity range is 2, and the upper limit of the second quantity range is 7; or the first value may be a larger value or a smaller value, and the upper limit and the lower limit of the second quantity range may be adjusted according to the first value. This is not limited in this embodiment of this application.

The following describes an example in which the first value is 8, that is, the plurality of LCGs include eight LCGs. In this case, the long BSR is used to report BSRs of the eight LCGs, and the flexible BSR is used to report BSRs of two to seven LCGs.

In an embodiment, the determining, by the terminal device, the target BSR format in the at least three BSR formats according to a trigger manner of the BSR and a quantity of LCGs included in the first LCG set includes:

if the trigger manner of the BSR is a regular BSR or a periodic BSR, and the quantity of LCGs included in the first LCG set is one, determining, by the terminal device, the short BSR as the target BSR format;

if the trigger manner of the BSR is a regular BSR or a periodic BSR, and the quantity of LCGs included in the first LCG set falls within a first quantity range, determining, by the terminal device, the flexible BSR as the target BSR format; or if the trigger manner of the BSR is a regular BSR or a periodic BSR, and the quantity of LCGs included in the first LCG set is the first value, determining, by the terminal device, that the target BSR format is the long BSR.

That is, when the quantity of LCGs included in the first LCG set is 1, the terminal device determines to use the short BSR; when the quantity of LCGs included in the first LCG set is 3, that is, falls within the first quantity range, the terminal device determines to use the flexible BSR to report BSRs of three LCGs; or if the quantity of LCGs included in the first LCG set is 8, the terminal device determines to use the long BSR to report BSRs of the eight LCGs.

In another embodiment, the determining, by the terminal device, the target BSR format in the at least three BSR formats according to a trigger manner of the BSR and a quantity of LCGs included in the first LCG set includes: if the trigger manner of the BSR is a padding BSR, determining, by the terminal device, the target BSR format in the at least three BSR formats according to the quantity of LCGs included in the first LCG set and a size of an uplink grant resource.

Therefore, according to the information transmission method in this embodiment of this application, if the trigger manner of the BSR is the padding BSR, the terminal device can determine the target BSR format according to the first LCG set that has the to-be-transmitted data, and the size of the uplink grant resource, thereby improving resource utilization.

In a specific embodiment, the determining, by the terminal device, the target BSR format in the at least three BSR formats according to the quantity of LCGs included in the first LCG set and a size of an uplink grant resource includes determining, by the terminal device, the target BSR format in the at least three BSR formats according to the quantity of LCGs included in the first LCG set, and a size of a padding bit of a MAC PDU in the uplink grant resource.

For example, when the size of the uplink grant resource is sufficient to report a BSR of each LCG in the first LCG set, the terminal device determines that a quantity of LCGs that can be reported by using the target BSR format is greater than or equal to the quantity of LCGs included in the first LCG set; or if the size of the uplink grant resource is insufficient to report a BSR of each LCG in the first LCG set, the terminal device may report only BSRs of some LCGs in the first LCG set.

The determining, by the terminal device, the target BSR format in the at least three BSR formats according to the quantity of LCGs included in the first LCG set, and a size of a padding bit of a Media Access Control MAC protocol data unit PDU in the uplink grant resource includes:

if the size of the padding bit of the MAC PDU is greater than or equal to a size of a first resource required for performing reporting by using the short BSR, and the quantity of LCGs included in the first LCG set is one, determining, by the terminal device, the short BSR as the target BSR format;

if the size of the padding bit of the MAC PDU is greater than or equal to the size of the first resource required for performing reporting by using the short BSR and less than a size of a second resource that is required for reporting a BSR of each LCG in the first LCG set by using the flexible BSR, and the quantity of LCGs included in the first LCG set is greater than one, determining, by the terminal device, the truncated BSR as the target BSR format;

if the size of the padding bit of the MAC PDU is greater than or equal to a size of a second resource required for reporting a BSR by using the flexible BSR, and the quantity of LCGs included in the first LCG set falls within the second quantity range, determining, by the terminal device, the flexible BSR as the target BSR format; or if the size of the padding bit of the MAC PDU is greater than or equal to a size of a resource required for reporting a BSR by using the long BSR, and the quantity of LCGs included in the first LCG set is the first value, determining, by the terminal device, that the target BSR format is the long BSR.

For example, if the quantity of LCGs included in the first LCG set is one, and the size of the padding bit is greater than or equal to the size of the first resource required for performing reporting by using the short BSR, the terminal device may determine to use the short BSR for reporting. Herein, the first resource is a resource occupied by the short BSR and a subheader corresponding to the short BSR.

For another example, if the size of the padding bit is sufficient to report BSRs of three LCGs, and the first LCG set includes four LCGs, the size of the padding bit is less than the size of the second resource required for reporting BSRs of the four LCGs by using the flexible BSR. Herein, the second resource is a resource occupied by the flexible BSR by using which a BSR of each LCG in the first LCG set is reported and a subheader corresponding to the flexible BSR.

For another example, if the size of the padding bit is greater than or equal to the size of the second resource required for reporting a BSR of each LCG in the first LCG set by using the flexible BSR, and the quantity of LCGs included in the first LCG set is less than 8, the terminal device may determine to use the flexible BSR to report the BSR of each LCG in the first LCG set. For example, the first LCG set includes four LCGs. If the size of the padding bit is greater than or equal to a size of a resource occupied by the flexible BSR used to report the four LCGs and a corresponding subheader, the terminal device may report BSRs of the four LCGs by using the flexible BSR; alternatively, the first LCG set includes six LCGs. If the size of the padding bit is greater than or equal to a size of a resource occupied by the flexible BSR used to report the six LCGs and a corresponding subheader, the terminal device may report BSRs of the six LCGs by using the flexible BSR; In other words, when the size of the padding bit is sufficient to report the BSR of each LCG in the first LCG set, and the quantity of LCGs included in the first LCG set falls within the second quantity range, the terminal device may use the flexible BSR to report the BSR of each LCG in the first LCG set.

For another example, if the size of the padding bit is greater than or equal to a size of a resource required for reporting a BSR by using the long BSR, and the quantity of LCGs included in the first LCG set is 8, the terminal device may use the long BSR to report the BSR of each LCG in the first LCG set. The resource required for reporting the BSR by using the long BSR is a size of the long BSR and a size of a subheader corresponding to the long BSR. In other words. When the padding bit is sufficient to report BSRs of eight LCGs, and the first LCG set includes 8 LCGs, the terminal device may use the long BSR to report the BSR of each LCG in the first LCG set.

Therefore, according to the information transmission method in this embodiment of this application, when the trigger manner of the BSR is the padding BSR, the terminal device can determine a specific BSR format to be used, according to the quantity of LCG included in the first LCG set, and the size of the padding bit. Therefore, the size of the padding bit of the MAC PDU can be used to the maximum extent, thereby helping improve the resource utilization.

In some embodiments, S220 may include: if the truncated BSR is determined as the target BSR format, and the quantity of LCGs included in the first LCG set is greater than one, preferentially reporting, by the terminal device, a BSR of an LCG corresponding to a logical channel having a high priority.

In this embodiment, if the quantity of LCGs included in the first LCG set is greater than 1, but the truncated BSR cannot be used to report the BSR of each LCG, the terminal device may preferentially report a BSR of an LCG that corresponds to a logical channel having a relatively high priority and that is in the first LCG set.

Figure 4:
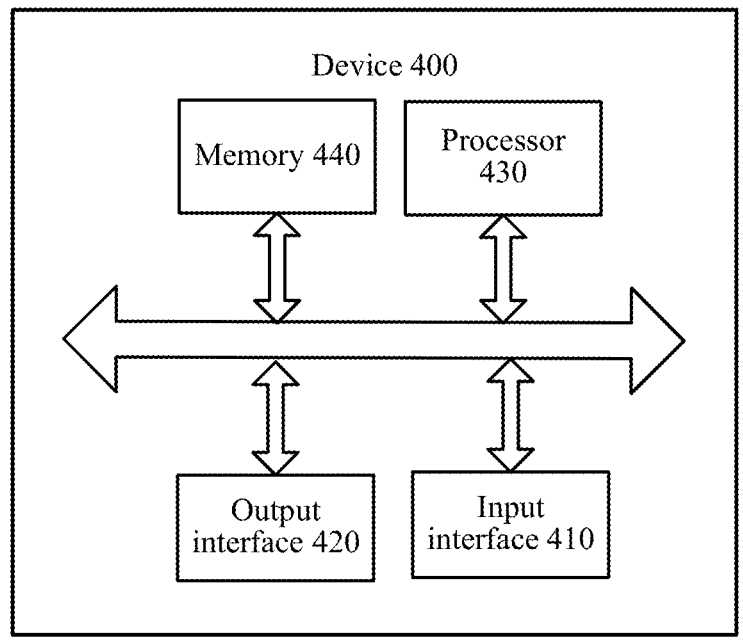
FIG. 4 is a schematic block diagram of an information transmission device according to another embodiment of this application.

The foregoing describes the method embodiments in this application in detail with reference to FIG. 2, and the following describes apparatus embodiments in this application in detail with reference to FIG. 3 and FIG. 4. It should be understood that, the apparatus embodiments and the method embodiments correspond to each other, and for a similar description, refer to the method embodiments.

FIG. 3 is a schematic block diagram of an information transmission device according to an embodiment of this application. The device 300 in FIG. 3 includes a determining module 310, configured to determine a target BSR format in at least three BSR formats according to a first LCG set that is in a plurality of LCGs and that has to-be-transmitted data, where the first LCG set includes at least one LCG; and a communications module 320, configured to report BSRs of some or all LCGs in the first LCG set by using the target BSR format.

In some embodiments, the determining module 310 is specifically configured to determine the target BSR format in the at least three BSR formats according to a trigger manner of the BSR and a quantity of LCGs included in the first LCG set.

In some embodiments, the at least three BSR formats include: a short BSR, a truncated BSR, and a flexible long BSR, where the short BSR is used to report a BSR of one LCG, the truncated BSR is used to report a BSR of one LCG, the flexible long BSR is used to report BSRs of LCGs within a first quantity range, and a lower limit of the first quantity range is 1.

In some embodiments, an upper limit of the first quantity range is 8.

In some embodiments, the determining module 310 is further configured to:
if the trigger manner of the BSR is a regular BSR or a periodic BSR, and the quantity of LCGs included in the first LCG set is greater than one, determine the flexible long BSR as the target BSR format; or
if the trigger manner of the BSR is a regular BSR or a periodic BSR, and the quantity of LCGs included in the first LCG set is one, determine the short BSR as the target BSR format.

In some embodiments, the determining module 310 is further configured to: if the trigger manner of the BSR is a padding BSR, determine the target BSR format in the at least three BSR formats according to the quantity of LCGs included in the first LCG set and a size of an uplink grant resource.

In some embodiments, the determining module 310 is specifically configured to determine the target BSR format in the at least three BSR formats according to the quantity of LCGs included in the first LCG set, and a size of a padding bit of a Media Access Control MAC protocol data unit PDU in the uplink grant resource.

In some embodiments, the determining module 310 is specifically configured to:
if the size of the padding bit of the MAC PDU is greater than or equal to a size of a first resource required for performing reporting by using the short BSR, and the quantity of LCGs included in the first LCG set is one, determine the short BSR as the target BSR format;
if the size of the padding bit of the MAC PDU is greater than or equal to a size of a first resource required for performing reporting by using the short BSR and less than a size of a second resource that is required for reporting a BSR of each LCG in the first LCG set by using the flexible long BSR, and the quantity of LCGs included in the first LCG set is greater than one, determine the truncated BSR as the target BSR format; or
if the size of the padding bit of the MAC PDU is greater than or equal to a size of a second resource, determine the flexible long BSR as the target BSR format.

In some embodiments, the communications module 320 is specifically configured to: if the truncated BSR is determined as the target BSR format, preferentially report a BSR of an LCG corresponding to a logical channel having a high priority.

In some embodiments, the at least three BSR formats include: a short BSR, a truncated BSR, a flexible BSR, and a long BSR, where the short BSR is used to report a BSR of one LCG, the truncated BSR is used to report a BSR of one LCG, the flexible BSR is used to report BSRs of LCGs within a second quantity range, a lower limit of the second quantity range is greater than 1, an upper limit of the second quantity range is less than a first value, and a quantity of BSRs that can be reported by using the long BSR is the first value.

In some embodiments, the first value is 8, the lower limit of the second quantity range is 2, and the upper limit of the second format range is 7.

In some embodiments, the determining module 310 is further configured to:

if the trigger manner of the BSR is a regular BSR or a periodic BSR, and the quantity of LCGs included in the first LCG set is one, determine the short BSR as the target BSR format;

if the trigger manner of the BSR is a regular BSR or a periodic BSR, and the quantity of LCGs included in the first LCG set falls within a first quantity range, determine the flexible BSR as the target BSR format; or if the trigger manner of the BSR is a regular BSR or a periodic BSR, and the quantity of LCGs included in the first LCG set is the first value, determining, by the terminal device, that the target BSR format is the long BSR.

In some embodiments, the determining module 310 is further configured to: if the trigger manner of the BSR is a padding BSR, determine the target BSR format in the at least three BSR formats according to the quantity of LCGs included in the first LCG set and a size of an uplink grant resource.

In some embodiments, the determining module 310 is specifically configured to determine the target BSR format in the at least three BSR formats according to the quantity of LCGs included in the first LCG set, and a size of a padding bit of a MAC PDU in the uplink grant resource.

In some embodiments, the determining module 310 is specifically configured to:

if the size of the padding bit of the MAC PDU is greater than or equal to a size of a first resource required for performing reporting by using the short BSR, and the quantity of LCGs included in the first LCG set is one, determine the short BSR as the target BSR format;

if the size of the padding bit of the MAC PDU is greater than or equal to a size of a first resource required for performing reporting by using the short BSR and less than a size of a second resource that is required for reporting a BSR of each LCG in the first LCG set by using the flexible BSR, and the quantity of LCGs included in the first LCG set is greater than one, determine the truncated BSR as the target BSR format;

if the size of the padding bit of the MAC PDU is greater than or equal to a size of a second resource required for reporting a BSR by using the flexible BSR, and the quantity of LCGs included in the first LCG set falls within the second quantity range, determine the flexible BSR as the target BSR format; or if the size of the padding bit of the MAC PDU is greater than or equal to a size of a resource required for reporting a BSR by using the long BSR, and the quantity of LCGs included in the first LCG set is the first value, determine that the target BSR format is the long BSR.

In some embodiments, the communications module 320 is specifically configured to: if the truncated BSR is determined as the target BSR format, and the quantity of LCGs included in the first LCG set is greater than one, preferentially report a BSR of an LCG corresponding to a logical channel having a high priority.

Specifically, the device 300 may correspond to (for example, the device 300 may be configured as or may be) the terminal device described in the foregoing method 200, and the modules or units in the device 300 are configured to perform various actions or processing processes performed by the terminal device in the foregoing method 200. Herein, to avoid repetition, detailed descriptions are omitted.

As shown in FIG. 4, an embodiment of this application further provides an information transmission device 400, and the device 400 may be the device 300 in FIG. 3 and can be configured to perform corresponding content of the terminal device in the method 200 shown in FIG. 2. The device 400 includes: an input interface 410, an output interface 420, a processor 430, and a memory 440, and the input interface 410, the output interface 420, the processor 430, and the memory 440 may be connected by using a bus system. The memory 440 is configured to store, for example, a program, an instruction, or code. The processor 430 is configured to execute the program, the instruction, or the code in the memory 440, to control the input interface 410 to receive a signal and control the output interface 420 to send a signal, to complete operations in the foregoing method embodiments.

It should be understood that, in this embodiment of this application, the processor 430 may be a central processing unit (CPU), and the processor 430 may be another general processor, digital signal processor (DSP), application-specific integrated circuit (ASIC), field-programmable gate array (FPGA), or another programmable logic device, independent gate or transistor logic device, independent hardware component, and the like. The general purpose processor may be a microprocessor, or the processor may be any regular processor or the like.

The memory 440 may include a read-only memory and a random access memory, and provides an instruction and data to the processor 430. A part of the memory 440 may further include a non-volatile random access memory. For example, the memory 440 may further store device type information.

In an implementation process, each piece of content of the foregoing methods may be implemented by a hardware-integrated logic circuit in the processor 430 or by an instruction in a software form. The content of the method disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory or electrically erasable programmable memory, or a register. The storage medium is located in the memory 440, and the processor 430 reads information in the memory 440 and completes the content in the foregoing methods in combination with hardware of the processor. To avoid repetition, details are not described herein again.

In a specific implementation, the determining module 310 included in the device 300 in FIG. 3 may be implemented by the processor 430 in FIG. 4, and the communications module 320 included in the device 300 in FIG. 3 may be implemented by the input device 410 and the output interface 420 in FIG. 4.

An embodiment of this application further provides a computer readable storage medium. The computer readable storage medium stores one or more programs, the one or more programs include an instruction, and when the instruction is executed by a portable electronic device including a plurality of applications, the portable electronic device is enabled to perform the method in the embodiment shown in FIG. 2.

An embodiment of this application further provides a computer program. The computer program includes an instruction, and when the computer program is executed by a computer, the computer is enabled to perform a corresponding procedure of the method in the embodiment shown in FIG. 2.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes various media that can store program code, for example: a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An information transmission method comprising:
determining, by a terminal device, a target buffer status report (BSR) format in at least three BSR formats according to a trigger manner of a BSR and a quantity of logical channel groups (LCG) comprised in a first LCG set that is in a plurality of LCGs and that has to-be-transmitted data, wherein the first LCG set comprises at least one LCG, and the at least three BSR formats comprise a short BSR, a truncated BSR, and a flexible long BSR, or the short BSR, the truncated BSR, a flexible BSR, and a long BSR; and
reporting, by the terminal device, BSRs of some or all LCGs in the first LCG set by using the target BSR format;
wherein when the trigger manner of the BSR is a padding BSR and the at least three BSR formats comprise the short BSR, the truncated BSR and the flexible long BSR, determining, by the terminal device, the target BSR format in the at least three BSR formats according to the trigger manner of the BSR and the quantity of LCGs comprised in the first LCG set comprising:
if a size of a padding bit of a Media Access Control MAC protocol data unit PDU in an uplink grant resource is greater than or equal to a size of a first resource required for performing reporting by using the short BSR, and the quantity of LCGs comprised in the first LCG set is one, determining, by the terminal device, the short BSR as the target BSR format;
if the size of the padding bit of the MAC PDU in the uplink grant resource is greater than or equal to the size of the first resource required for performing reporting by using the short BSR and less than a size of a second resource that is required for reporting a BSR of each LCG in the first LCG set by using the flexible long BSR, and the quantity of LCGs comprised in the first LCG set is greater than one, determining, by the terminal device, the truncated BSR as the target BSR format; and
if the size of the padding bit of the MAC PDU in the uplink grant resource is greater than or equal to a size of a second resource, determining, by the terminal device, the flexible long BSR as the target BSR format.

2. The method according to claim 1, wherein the short BSR is used to report a BSR of one LCG, the truncated BSR is used to report a BSR of one LCG, the flexible long BSR is used to report BSRs of LCGs within a first quantity range, and a lower limit of the first quantity range is 1.

3. The method according to claim 2, wherein an upper limit of the first quantity range is 8.

4. The method according to claim 2, wherein when the at least three BSR formats comprise the short BSR, the truncated BSR and the flexible long BSR, determining, by the terminal device, the target BSR format in the at least three BSR formats according to the trigger manner of the BSR and the quantity of LCGs comprised in the first LCG set comprises:
if the trigger manner of the BSR is a regular BSR or a periodic BSR, and the quantity of LCGs comprised in the first LCG set is greater than one, determining, by the terminal device, the flexible long BSR as the target BSR format; or
if the trigger manner of the BSR is a regular BSR or a periodic BSR, and the quantity of LCGs comprised in the first LCG set is one, determining, by the terminal device, the short BSR as the target BSR format wherein reporting, by the terminal device, the BSRs of some or all the LCGs in the first LCG set by using the target BSR format comprises;

if the truncated BSR is determined as the target BSR format, preferentially reporting, by the terminal device, a BSR of an LCG corresponding to a logical channel having a high priority.

5. The method according to claim 1, wherein the first resource is a resource occupied by the short BSR and a subheader corresponding to the short BSR; and the second resource is a resource occupied by the flexible long BSR by using which a BSR of each LCG in the first LCG set is reported and a subheader corresponding to the flexible long BSR.

6. The method according to claim 1, wherein the short BSR is used to report a BSR of one LCG, the truncated BSR is used to report a BSR of one LCG, the flexible BSR is used to report BSRs of LCGs within a second quantity range, a lower limit of the second quantity range is greater than 1, an upper limit of the second quantity range is less than a first value, and a quantity of BSRs that can be reported by using the long BSR is the first value.

7. The method according to claim 6, wherein the first value is 8, the lower limit of the second quantity range is 2, and the upper limit of the second quantity range is 7.

8. The method according to claim 6, wherein when the at least three BSR formats comprise the short BSR, the truncated BSR, the flexible BSR and the long BSR, determining, by the terminal device, the target BSR format in the at least three BSR formats according to the trigger manner of the BSR and the quantity of LCGs comprised in the first LCG set comprises:

if the trigger manner of the BSR is a regular BSR or a periodic BSR, and the quantity of LCGs comprised in the first LCG set is one, determining, by the terminal device, the short BSR as the target BSR format;

if the trigger manner of the BSR is a regular BSR or a periodic BSR, and the quantity of LCGs comprised in the first LCG set falls within a first quantity range, determining, by the terminal device, the flexible BSR as the target BSR format; or if the trigger manner of the BSR is a regular BSR or a periodic BSR, and the quantity of LCGs comprised in the first LCG set is the first value, determining, by the terminal device, that the target BSR format is the long BSR, wherein the reporting, by the terminal device, BSRs of some or all the LCGs in the first LCG set by using the target BSR format comprises;

if the truncated BSR is determined as the target BSR format, and the quantity of LCGs comprised in the first LCG set is greater than one, preferentially reporting, by the terminal device, a BSR of an LCG corresponding to a logical channel having a high priority.

9. The method according to claim 6, wherein when the trigger manner of the BSR is a padding BSR and the at least three BSR formats comprise the short BSR, the truncated BSR, the flexible BSR and the long BSR, determining, by the terminal device, the target BSR format in the at least three BSR formats according to the trigger manner of the BSR and the quantity of LCGs comprised in the first LCG set comprises:

if the size of the padding bit of the MAC PDU in the uplink grant resource is greater than or equal to the size of the first resource required for performing reporting by using the short BSR, and the quantity of LCGs comprised in the first LCG set is one, determining, by the terminal device, the short BSR as the target BSR format;

if the size of the padding bit of the MAC PDU in the uplink grant resource is greater than or equal to the size of the first resource required for performing reporting by using the short BSR and less than a size of a second resource that is required for reporting a BSR of each LCG in the first LCG set by using the flexible BSR, and the quantity of LCGs comprised in the first LCG set is greater than one, determining, by the terminal device, the truncated BSR as the target BSR format;

if the size of the padding bit of the MAC PDU in the uplink grant resource is greater than or equal to a size of a second resource required for reporting a BSR by using the flexible BSR, and the quantity of LCGs comprised in the first LCG set falls within the second quantity range, determining, by the terminal device, the flexible BSR as the target BSR format; and if the size of the padding bit of the MAC PDU in the uplink grant resource is greater than or equal to a size of a resource required for reporting a BSR by using the long BSR, and the quantity of LCGs comprised in the first LCG set is the first value, determining, by the terminal device, that the target BSR format is the long BSR.

10. An information transmission device comprising:

a processor, configured to determine a target BSR format in at least three BSR formats according to a trigger manner of a BSR and a quantity of LCGs comprised in a first LCG set that is in a plurality of LCGs and that has to-be-transmitted data, wherein the first LCG set comprises at least one LCG, and the at least three BSR formats comprise a short BSR, a truncated BSR, and a flexible long BSR, or the short BSR, the truncated BSR, a flexible BSR, and a long BSR; and a transceiver, configured to report BSRs of some or all LCGs in the first LCG set by using the target BSR format;

wherein when the trigger manner of the BSR is a padding BSR and the at least three BSR formats comprise the short BSR, the truncated BSR and the flexible long BSR, the processor is further configured to:

if a size of a padding bit of a Media Access Control MAC protocol data unit PDU in an uplink grant resource is greater than or equal to a size of a first resource required for performing reporting by using the short BSR, and the quantity of LCGs comprised in the first LCG set is one, determine the short BSR as the target BSR format;

if the size of the padding bit of the MAC PDU in the uplink grant resource is greater than or equal to the size of the first resource required for performing reporting by using the short BSR and less than a size of a second resource that is required for reporting a BSR of each LCG in the first LCG set by using the flexible long BSR, and the quantity of LCGs comprised in the first LCG set is greater than one, determine the truncated BSR as the target BSR format; and if the size of the padding bit of the MAC PDU in the uplink grant resource is greater than or equal to a size of a second resource, determine the flexible long BSR as the target BSR format.

11. The device according to claim 10, wherein the short BSR is used to report a BSR of one LCG, the truncated BSR is used to report a BSR of one LCG, the flexible BSR is used to report BSRs of LCGs within a second quantity range, a lower limit of the second quantity range is greater than 1, an upper limit of the second quantity range is less than a first value, and a quantity of BSRs that can be reported by using the long BSR is the first value.

* * * * *